United States Patent [19]
Barnes et al.

[11] Patent Number: 5,764,788
[45] Date of Patent: Jun. 9, 1998

[54] STRAND ORIENTATION SENSING

[75] Inventors: Derek Barnes, West Vancouver; John E. Ens, Richmond, both of Canada

[73] Assignee: MacMillan Bloedel Limited, Vancouver, Canada

[21] Appl. No.: 522,451

[22] Filed: Aug. 31, 1995

[51] Int. Cl.⁶ .................................................. G06K 9/00
[52] U.S. Cl. .......................... 382/108; 382/202; 382/286
[58] Field of Search ................................. 382/100, 108, 382/199, 202, 203, 204, 281, 286, 289, 302, 303; 348/88; 250/559.44, 559.01

[56] References Cited

U.S. PATENT DOCUMENTS

| | | | |
|---|---|---|---|
| 4,731,858 | 3/1988 | Grasmueller et al. | 382/199 |
| 4,731,860 | 3/1988 | Wahl | 382/281 |

OTHER PUBLICATIONS

Ze-Nian Li and Danpo Zhang,"Fast Line Detection in a Hybrid Pyramid", Proceedings of Vision Interface '92, pp. 143-150, Vancouver, B.C., May 1992.

Primary Examiner—Leo Boudreau
Assistant Examiner—Phuoc Tran
Attorney, Agent, or Firm—C. A. Rowley

[57] ABSTRACT

The orientation of strands relative to a selected axis is determined by analyzing a digitized grey scale image to select edge pixels therefrom that may define the edges of strands segmenting the image into a plurality of subimages and processing one of the subimages by defining pixel lines merging the pixel lines to form lines and culling selected one of the lines in the subimage. The subimage is then combined to co-terminus other of the subimages to form a combined subimage which is processed in the same manner by merging pixel lines to form lines and culling selected line in the combined subimage. This process is repeated by combining further subimages and processing until substantially all of the image has been processed to provide the plurality of strand lines defining strand edges and then determining the orientation of the strand lines relative to the axis.

17 Claims, 9 Drawing Sheets

STRAND ORIENTATION SENSING

FIELD OF INVENTION

The present invention relates to a system for determining strand orientation, more particularly, the present invention relates to an optical system for determining strand orientation.

BACKGROUND OF THE INVENTION

In the manufacture of oriented strand board (OSB), the orientation of the strands plays a significant role in determining the strength of board, however, there is no equipment available for on-line measurement of strand angle relative to a selected direction, generally the longitudinal axis of the product being made.

Attempts have been made to detect strand angle by optically detecting the strand and then defining their mean orientation. However, to date, none has been successful.

In one such system a two dimensional Fourier Transform was applied to a digitized frame representing the surface of a mat of strands and used to find the averages of the phase changes which was then used unsuccessfully in an attempt to define average strand angle. There are many techniques for analysis of images to define lines. One effective technique is described in a paper entitled "Fast Line Detection in a Hybrid Pyramid" by Ze-Nian Li and Danpo Zhang.

BRIEF DESCRIPTION OF THE PRESENT INVENTION

It is an object of the present invention to provide an optical system employing vision analysis to determine the orientation of strands.

Broadly, the present invention relates to a system for determining the orientation of strands relative to a selected axis by obtaining a grey scale image containing a plurality of said strands with one side thereof emphasized, selecting edge pixels representative of said side, means for segmenting said image into a plurality of subimages, means for processing a selected one of said subimages to define pixel groups composed of edge pixels meeting a first set of criteria, apply a regression technique to said edge pixels of each said group to define straight pixel lines, merging said straight modified pixel lines to form line segment forming groups of edge pixels and applying said regression to said line segment groups of edge pixels to define straight line segments and culling selected ones of said straight lines in said subimage to provide a modified subimage, means for combining said modified subimage with co-terminus other of said modified subimages that have been similarly processed thereby to form a combined subimage, processing said combined subimage by merging said straight pixel lines and said straight line segments meeting a second set of criteria to form further line segment groups of edge pixels, apply said regression technique to said edge pixels of said further line segment groups of edge pixels to form further straight line segments and cullings selected one of said straight lines in said combined subimage and repeating said combining and processing until all said image has been processed to provide a plurality of strand line forming groups of edge pixels converting said edge pixels by said regression technique into straight strand lines and means for defining the orientation of said straight strand lines relative to said axis.

Preferably, said regression technique will be a least squares technique and said straight lines will be the best fit straight line generated by said least squares technique.

Preferably, said merging comprises a hierarchical merging which includes merging based on a relative positions of said pixels in said straight lines.

Preferably, said merging further includes determining collinearity of said straight lines and merging straight lines and wherein said collinearity is one of the criteria for merging of said straight lines.

Preferably, said collinearity is based on distances between ends of an adjacent pair of straight line segments being processed.

Preferably, said collinearity is based on three shortest distances between said end points and said other straight line segment.

Preferably, said culling comprises determining the end points of a straight line and culling said straight lines if said end points are within a predetermined spacing from each other.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
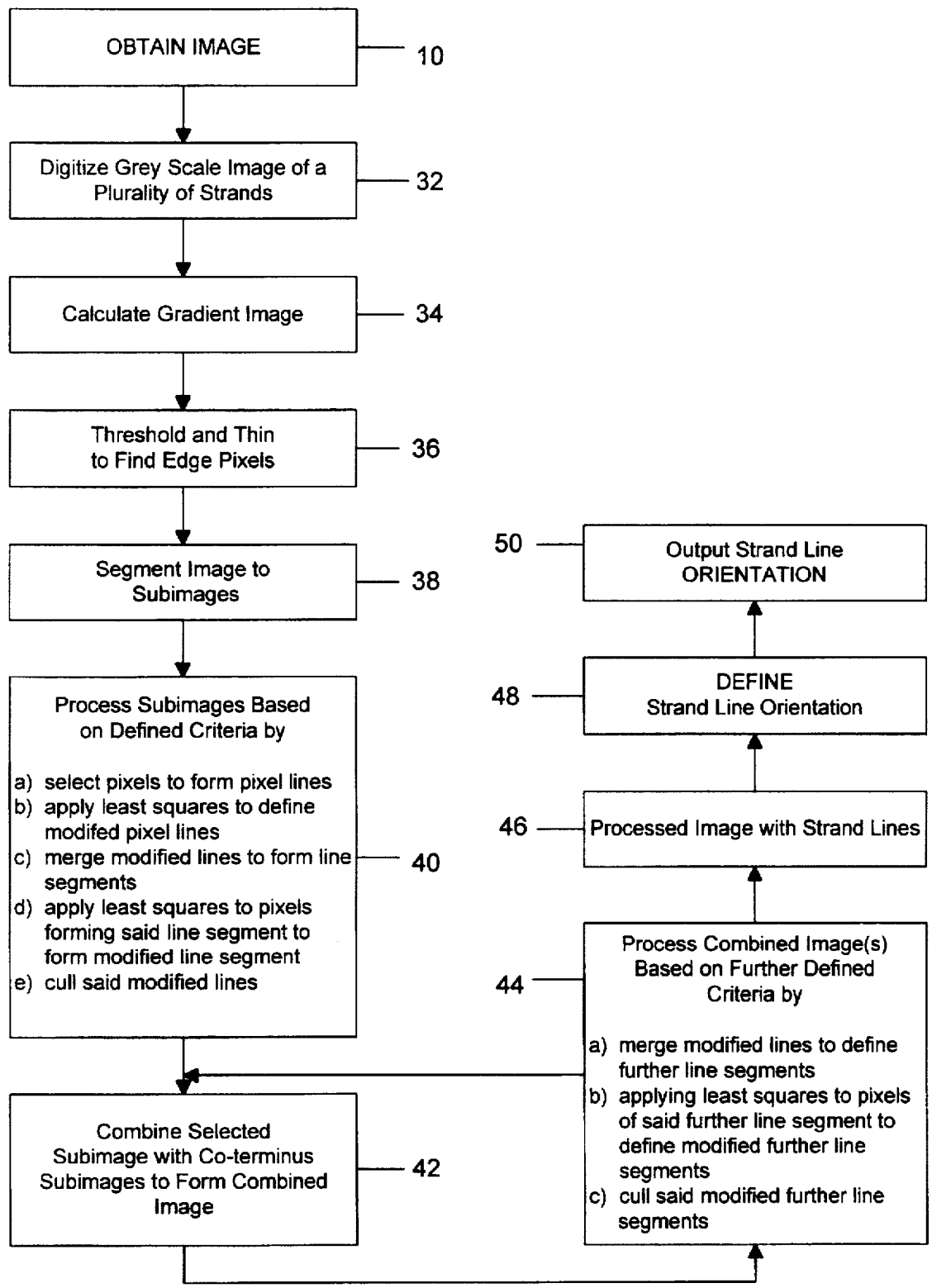
FIG. 1 is a schematic flow diagram illustrating the present invention.
Figure 2:
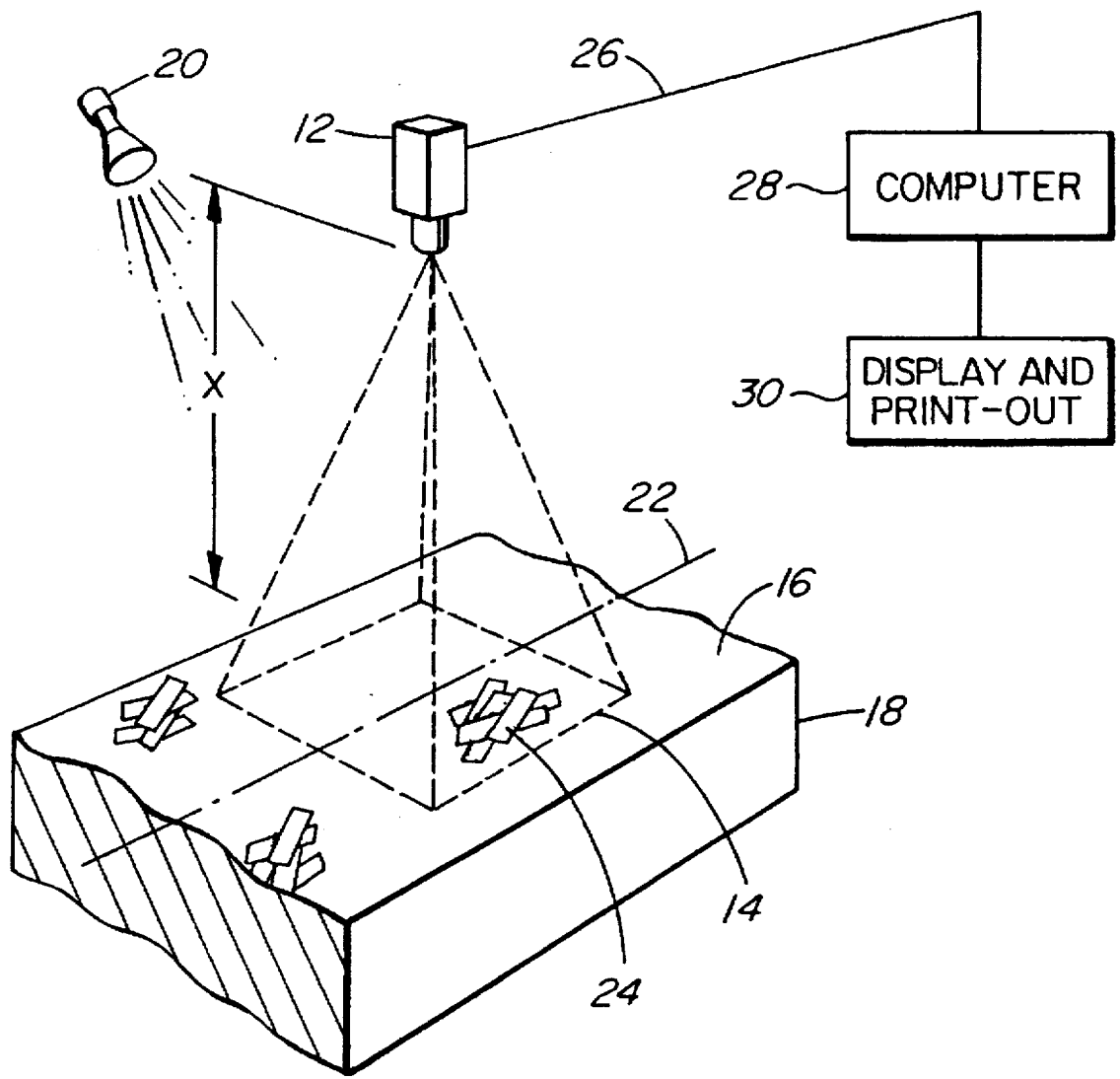
FIG. 2 is an illustration of the camera system to produce a frame.

As shown in FIG. 1, the first step in the process is to obtain an image as schematically indicated at 10. This step is accomplished as illustrated in FIG. 2 using a camera 12 which may be either a line camera or a frame taking camera. If a line camera is used, an image will be formed by accumulating sufficient lines to provide the desired size of image.

The area 14 shown in dot-dash lines in FIG. 2 of the surface 16 of a layup or the like 18 of oriented strands is illuminated by side lumination from a light source 20 so that shadows are cast along at least one side edge of each of the strands, i.e. the light 20 projects light or directs light onto the surface 16 to illuminate the area 14 from a direction preferably substantially perpendicular to the longitudinal axis 22 and from above the surface 16 so that side edges of the strand such as the strand 24 on the side of the strand remote from the light 20 cast a shadow or darken line along that edge. The camera 12 takes a picture or image of the area 14 and these shadows show as lines darker than the adjacent portion of the strand. Obviously, only the top layer(s) of strands will be examined.

The height of the camera 12 above the surface 16 as indicated by the dimension x is known and the focal angle is also known and therefore the size of the area 14 which is represented on the plane 16 (top of the layup) is also known so that the spacing of the pixels is known and represent a known length of the plane 16 or in the area 14.

Information from the cameras 12 as indicated by a line 26 is delivered to a programmed computer 28 that carries out the various steps in the process and then displays the end results or prints out the end result as indicated at 30.

Referring back to FIG. 1, the obtained image is converted to a digitized grey scale image as indicated at 32 using conventional methods.

The next step is to find the edge pixels as indicated at 34. The preferred technique is to apply Sobol operators using, for example, 3 by 3 convolution kernels, which calculate the horizontal and vertical gradients. The pixels are then thresholded based on the Sobol gradient which reduces the number of pixels that are retained and these maintained pixels represent edges of the various strands in the image. The threshold value is set to eliminate pixels representing the grain structure of the wood strands and this may require tuning if species is changed.

After the horizontal and vertical gradients have been thresholded, they are thinned as indicated at 36 in FIG. 1. In the thinning operation, a one dimensional window is used and if the pixel at the center of the window has the lightest rating in the window, it is left marked, otherwise it is eliminated. The window is in the vertical direction for the horizontal gradient and in the horizontal direction for the vertical gradient. The size of the window used for thinning is preferably selected sufficiently large that the shadows being detected preferably are all reduced to one set of edge pixels.

The horizontal and vertical images are now combined to form one edge image.

The image is now segmented into a plurality of subimages as indicated at 38, preferably by quartering and quartering the quarters, etc. to define subimages which, for example, may contain 8 by 8, i.e. 64 pixels. This step is indicated in FIG. 1 by box number 38.

Figure 3:
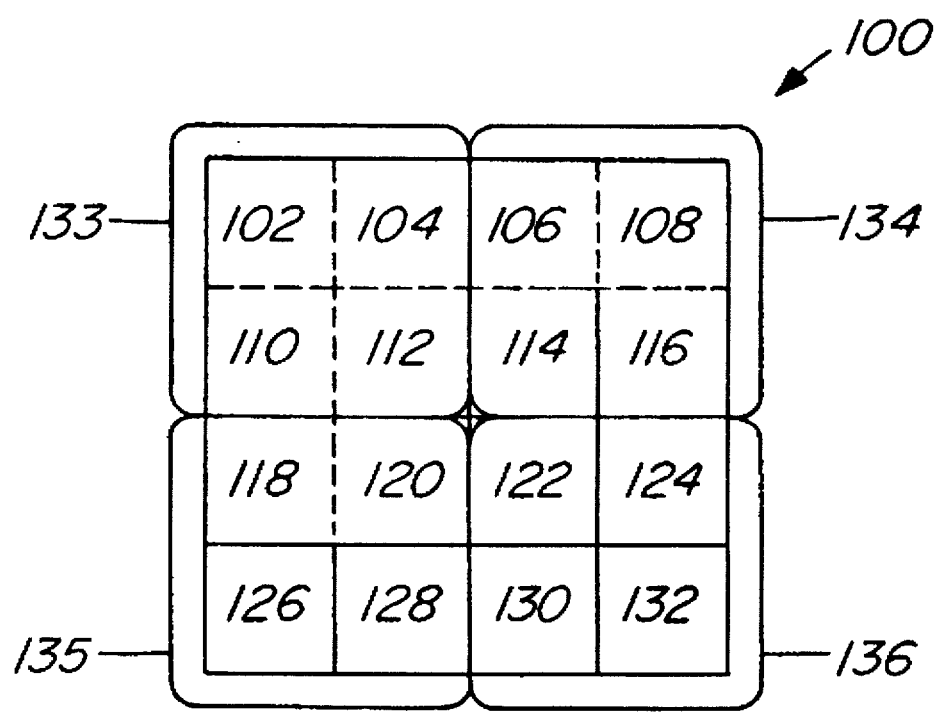
FIG. 3 is a schematic illustration of a segmented frame.

The subimages are then processed as indicated at 40 commencing with a selected subimage which probably would be the subimage in one corner of the image, i.e. image 100 shown in FIG. 3 which is divided into 16 subimages, 102, 104, 106 to 132, thus, the procedure could start with any one of the subimages (preferably 102, 106, 118 or 122) and processes those edge pixels that have not been discarded.

For the purposes of this discussion, assume that the processing starts with subimage 102 and a. defines pixel groups representing different possible lines in the subimage 102;
b. applies least squares regression to the edge pixels of each of the groups to define straight pixel lines each based on a group of pixels;
c. merges the so defined straight pixel lines to form groups of edge pixels each defining line segments;
d. apply least squares to each group defining a line segment to define a straight line segment based on each group of pixels, and
e. culls straight lines.

This process is carried out for each of the subimages 102 to 132.

Various routines may be used to carry out these steps. The preferred regression technique is the least squares technique and is referred to throughout the disclosure, however, other suitable regression techniques might prove acceptable.

The pixels found in steps 34 and 36 are merged into straight pixel lines and straight line segments in a first merging step. The first step of connecting individual pixels to define groups representing pixel lines is carried by retaining pixels with co-terminus borders in such groups.

The straight pixel lines are then hierarchically merged to form straight line segments which, for the purposes of the present invention, is defined by the formula $$y = m_h x + b_h \qquad (1)$$

where $m_h$ is the slope and $b_h$ is the y axis intercept. The problem with this representation is that $m_h$ approaches infinity when the line becomes vertical. Therefore, the representation $$x = b_v - m_v y \qquad (2)$$

will be used for vertical major lines (i.e. more vertical than horizontal). Here $m_v$ is the vertical slope and $b_v$ is the x axis intercept.

The application of least squares regression is used to define modified pixel lines. The usual equations for regression fit are $$m_h = \frac{mnum_h}{den_h} \text{ and } b_h = \frac{bnum_h}{den_h} \qquad (3)$$

where $mnum_h = NS_{xy} - S_x S_y$
$bnum_h = S_{xx} S_y - S_x S_{xy}$
$den_h = NS_{xx} - (S_x)^2$ $$S_x = \sum_{i=1}^{N} x_i, \ S_y = \sum_{i=1}^{N} y_i, \ S_{xx} = \sum_{i=1}^{N} x_i^2, \text{ and } S_{xy} = \sum_{i=1}^{N} x_i y_i$$

N=the number of points

For vertical major lines, it is preferred to minimize the error in the horizontal direction. The lines are then calculated from $$m_v = \frac{mnum_v}{den_v} \text{ and } b_v = \frac{bnum_v}{den_v} \qquad (4)$$

where $mnum_v = S_x S_y - NS_{xy}$
$bnum_v = S_{yy} S_x - S_y S_{xy}$
$den_v = NS_{yy} - (S_y)^2$ $$S_x = \sum_{i=1}^{N} x_i, \ S_y = \sum_{i=1}^{N} y_i, \ S_{yy} = \sum_{i=1}^{N} y_i^2, \text{ and } S_{xy} = \sum_{i=1}^{N} x_i y_i$$

These straight pixel lines are then merged to form line segment groups of pixels, each group representing a line segment and by regression technique (least squares) the straight line segment is defined for each such group. The end points of the straight line segments are found by projecting the outer bounding edge pixels (edge pixels at the X and Y extremities of the group) onto the straight lines. The projection of a point to a horizontal major line can be found with $$x_l = \frac{m_h y_p + x_p - m_h b_h}{m_h^2 + 1} \text{ and } y_l = \frac{m_h^2 y_p + b_h + m_h x_p}{m_h^2 + 1} \quad (5)$$

where the point on the line $(x_1, y_1)$ is the closest to the point $(x_p, y_p)$.

The projection of a point to a vertical major line can be found with $$x_l = \frac{m_v^2 x_p + b_v - m_v y_p}{m_v^2 + 1} \quad (6)$$

and $$y_l = \frac{-m_v x_p + y_p + m_v b_v}{m_v^2 + 1}$$

where the point on the line $(x_1, y_1)$ is the closest to the point $(x_p, y_p)$.

Two straight segments are merged if they are proximal or overlap, and also if they are collinear.

To calculate the proximity of two line segments, the distance between all four end points and the other line are calculated.

The distance between a point and a horizontal major line can be calculated with $$d = \frac{bnum_h + mnum_h x_p - den_h y_p}{\sqrt{mnum_h^2 + den_h^2}} \quad (7)$$

where d is the distance, $(x_p, y_p)$ is the point, and $mnum_h$, $bnum_h$, and $den_h$ can be obtained from the regression Equations 3.

The distance between a point and a vertical major line can be calculated with $$d = \frac{bnum_v - mnum_v y_p - den_v x_p}{\sqrt{mnum_v^2 + den_v^2}} \quad (8)$$

where d is the distance, $(x_p, y_p)$ is the point, and $mnum_v$, $bnum_v$, and $den_v$ can be obtained from the regression Equations 4.

If any of the four end point separations d are less than the end point separation tolerance D, then the two line segments are considered proximal. The end point separation tolerance is set small for the first stage of the merging operation and is increased as the size of the image (combined subimages) is increased. Applicant prefers to use a separation of D<=1 pixel for the first merging of lines.

It is also desirable to determine if the straight lines overlap. This can be done for both the x and y axes. For longer lines having a slope closer to vertical than horizontal, if either of the end point y values of the shorter line is between the y values of the end points of the longer line, the two lines are deemed to overlap. Similarly, if the longer line has a slope closer to horizontal, if either of the x values of the shorter line is between the x values of the longer line, the lines are deemed to overlap.

Figure 4:
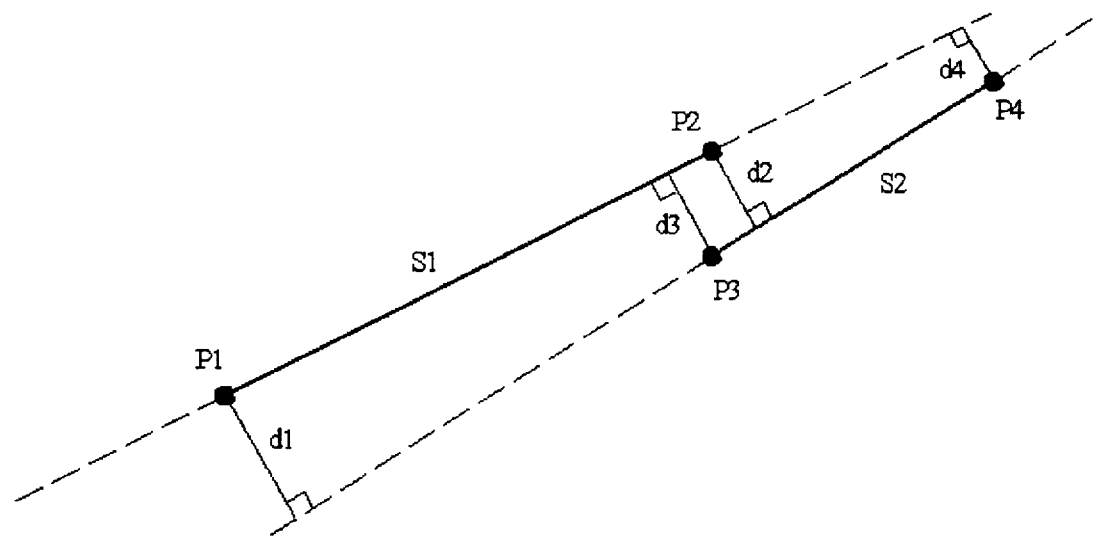
FIG. 4 illustrates determination of collinearity using four points.
Figure 5:
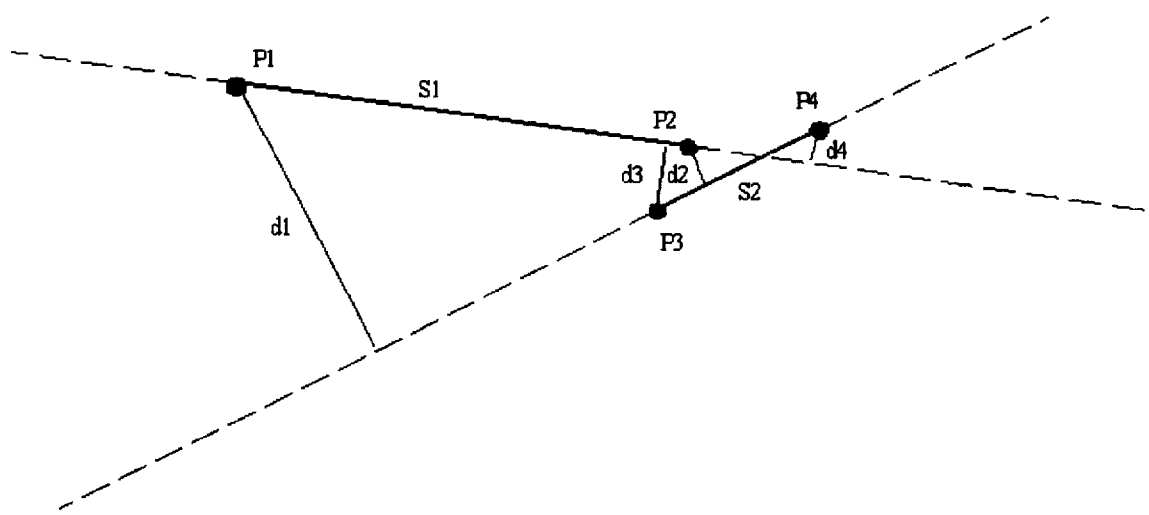
FIG. 5 illustrates determination of collinearity using three points.

It is necessary to determine if a pair of straight lines have collinearity. This is done by finding the distances between the end points of each straight line (or projection thereof) of the pair as will be described with respect to FIGS. 4 and 5. The straight pixel lines S1 and S2 have end points P1, P2 and a P3, P4 respectively. The distance between each of the end points and the other line is given by d1, d2, d3, d4. For the purposes of the present invention, if at least three of d1, d2, d3 and d4 are less than the preset maximum M, the two straight pixel lines will be merged to form a straight line segment. The maximum M is set small, for example, one pixel for the initial merging, and is then increased on successive mergings.

The next step is to cull the straight pixel lines that are less than the preselected length L, i.e. by determining the spacing between the end points of a straight line and comparing with a preselected length L. However, when dealing with subimages, it is important not to disregard pixels adjacent to the boundary of the subimages as these pixels may combine with pixels in the adjacent subimage to form groups representing lines. Thus, in a ring of thickness, L, inside the perimeter of the subimage, the modified pixel lines are not culled.

After all of the subimages have been processed, it is necessary to process combined adjacent subimages in the same manner as described above to form larger or combined subimages as indicated at 42 in FIG. 1. Each larger or combined subimage is formed by the selected subimage and its co-terminus subimages, i.e. if one started with subimage 102 of FIG. 3, then subimage 102 will be combined with subimage 104, 110 and 112 to form a first combined subimage 133.

The processing steps described above are iterated as indicated at 44 using defined parameters of D, M and L and preferably on each iteration, i.e. D, M and L each increases as the image size increases, i.e. when further subimages are added to the processed subimage.

This process is repeated by combining subimages 106, 108, 114 and 116 to form circled image 134; 118, 120, 126 and 128 to form circled image 135; 122, 124, 130 and 132 to form circled image 136. Previously combined 133, 134, 135 and 136 are combined to form the complete image 100. The values for D, M and L are increased as the size of the subimage being processed increases until the complete image 100 has been processed. The processing steps 44 and 42 are repeated to complete the processing and provide a processed image with edge lines defined therein as indicated at 46. The edge lines are based on regression of pixel groups included in merged straight lines that are combined to form the edge line.

The next step is to define the length and orientation of the edge lines (found by least squares). Obviously, the length is determined in the y direction by the spacing of the line ends pixel in the y direction and the length in the x direction is determined by the pixel spacing of the ends in the x direction. These are not true indications of the actual length of the strands since the strands overlap and the overlap may be deleted as the end of a strand, however, for weighting purposes, these lengths have been found satisfactory.

The horizontal and vertical resolutions of the image are then used to convert and define the actual length of the line based on $$l = \sqrt{(l_x R_x)^2 + (l_y R_y)^2}$$

where
l=line length
$l_y$=length in the y direction (y end pixel spacing)
$l_x$=length in the x direction (x end pixel spacing)
$R_x$=horizontal resolution in inches per pixel
$R_y$=vertical resolution in inches per pixel
The orientation of the strands relative to the vertical can be defined by $$\theta' = \tan^{-1}\left(\frac{R_y \tan\theta}{R_x}\right) - \frac{\pi}{2}$$

where θ' is the angle to the vertical and θ is the angle of the pixel lines.

The angles of the various lines are thereby calculated and may be used to determine the average or mean angle of the strands to the vertical.

In some cases, it may also be desirable to weight the calculation based on visible strand length so that the longer strand length would be given proportionally more weight, i.e. the average θ' based on the calculation $$\overline{\theta'} = \frac{\sum_{i=1}^{N} \theta'_i L_i}{\sum_{i=1}^{N} L_i}$$

where $L_i$=strand length.

EXAMPLES

Figure 6:
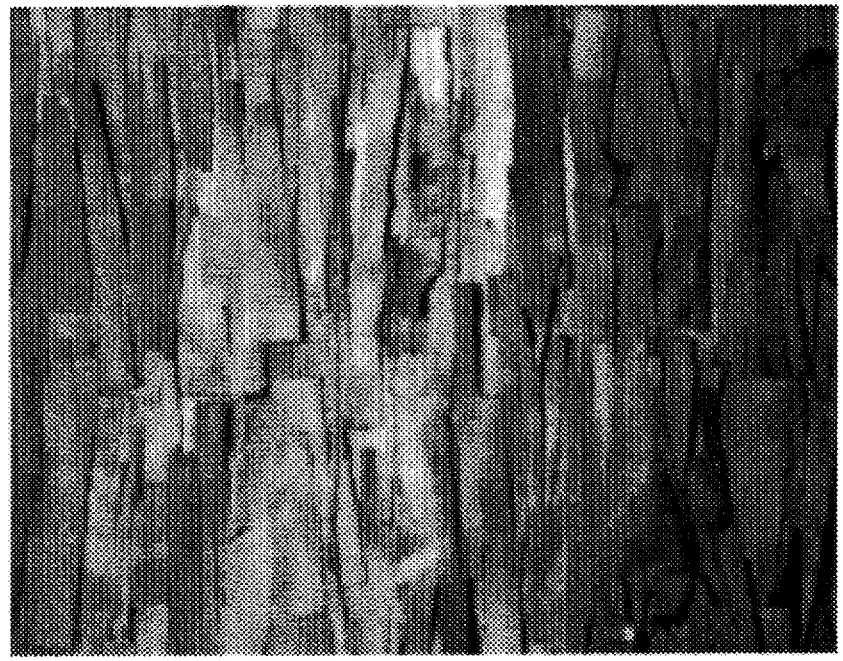
FIG. 6 is a copy of a photograph from which a digitized frame is produced and processed showing mainly parallel or aligned strands.
Figure 7:
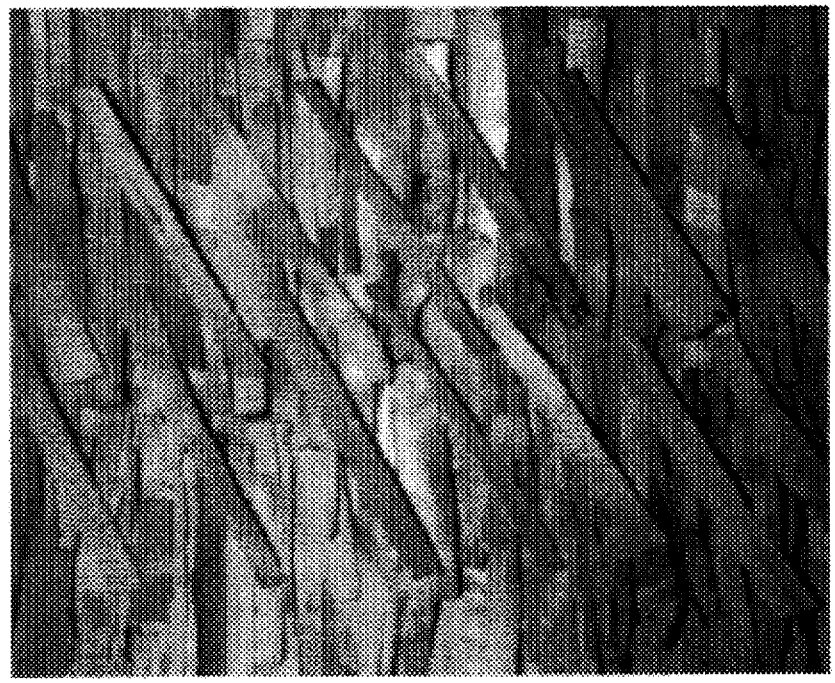
FIG. 7 is a copy of a photograph from which a digitized frame is produced and processed showing mainly strands arranged with two predominant orientations.
Figure 8:
FIG. 8 is a copy of a photograph from which a digitized frame is produced and processed showing random strand orientation.
Figure 9:
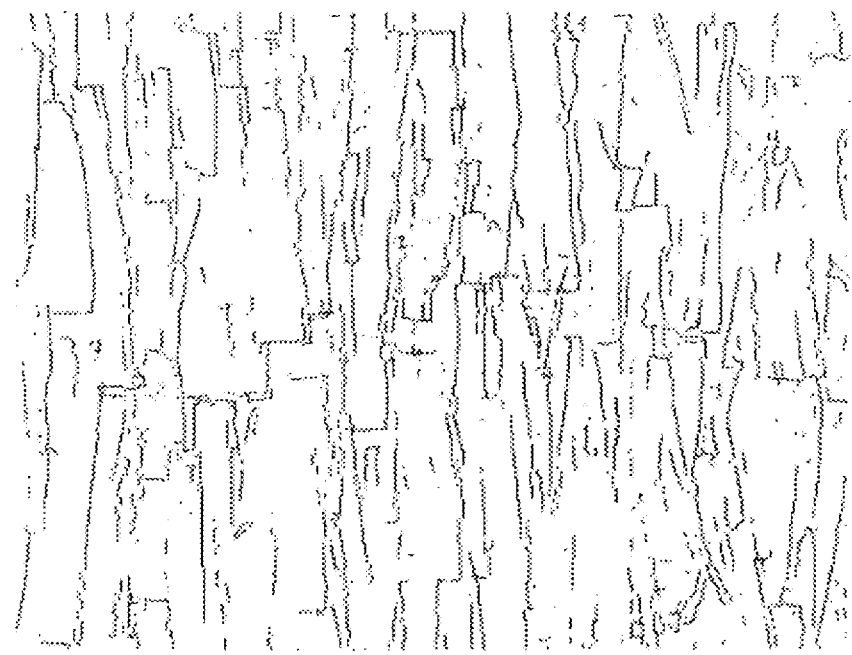
FIG. 9 shows edge pixels of the photo of FIG. 6.
Figure 10:
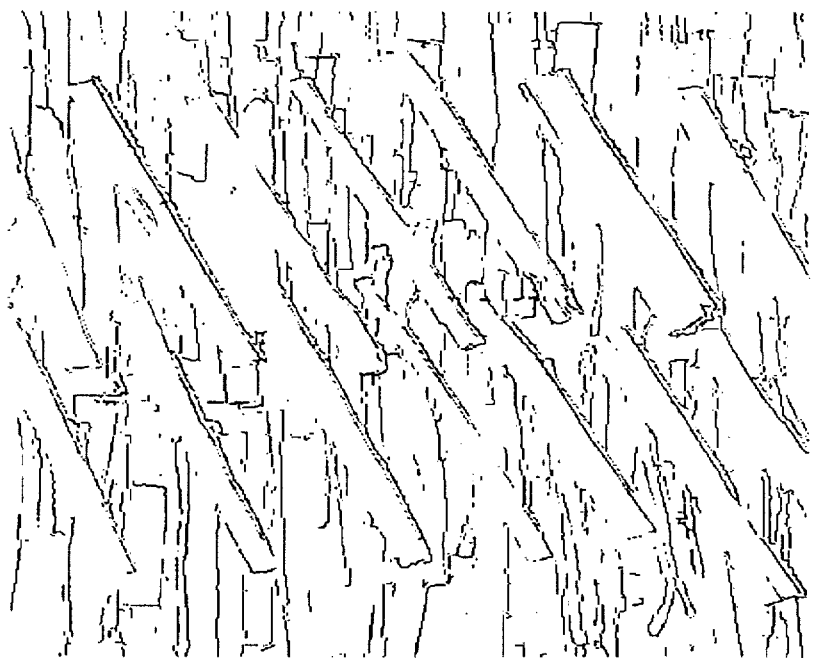
FIG. 10 shows edge pixels of the photo of FIG. 7.
Figure 11:
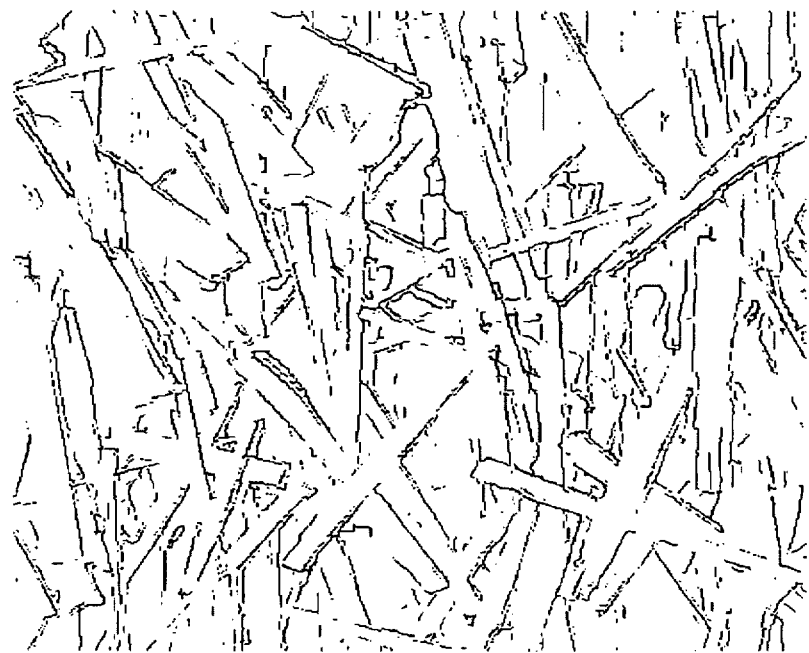
FIG. 11 shows edge pixels of the photo of FIG. 8.
Figure 12:
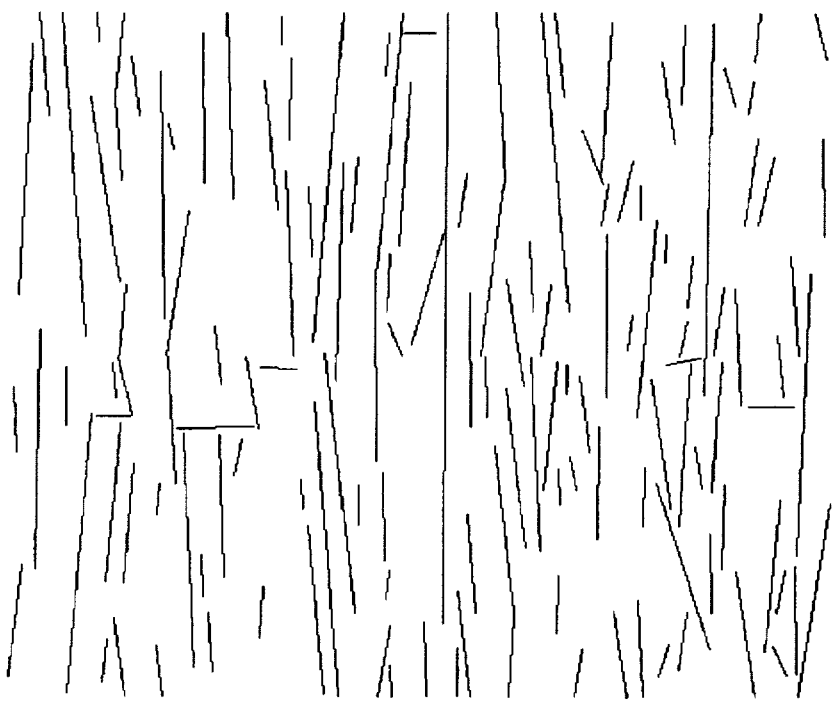
FIG. 12 shows the merged edge lines defined for the photo of FIG. 6.
Figure 13:
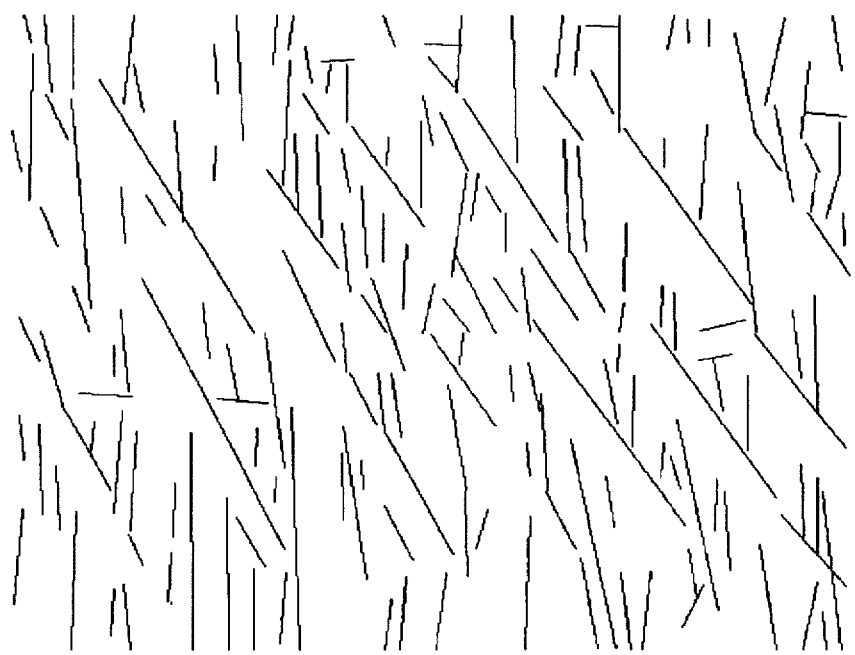
FIG. 13 shows the merged edge lines defined for the photo of FIG. 7.
Figure 14:
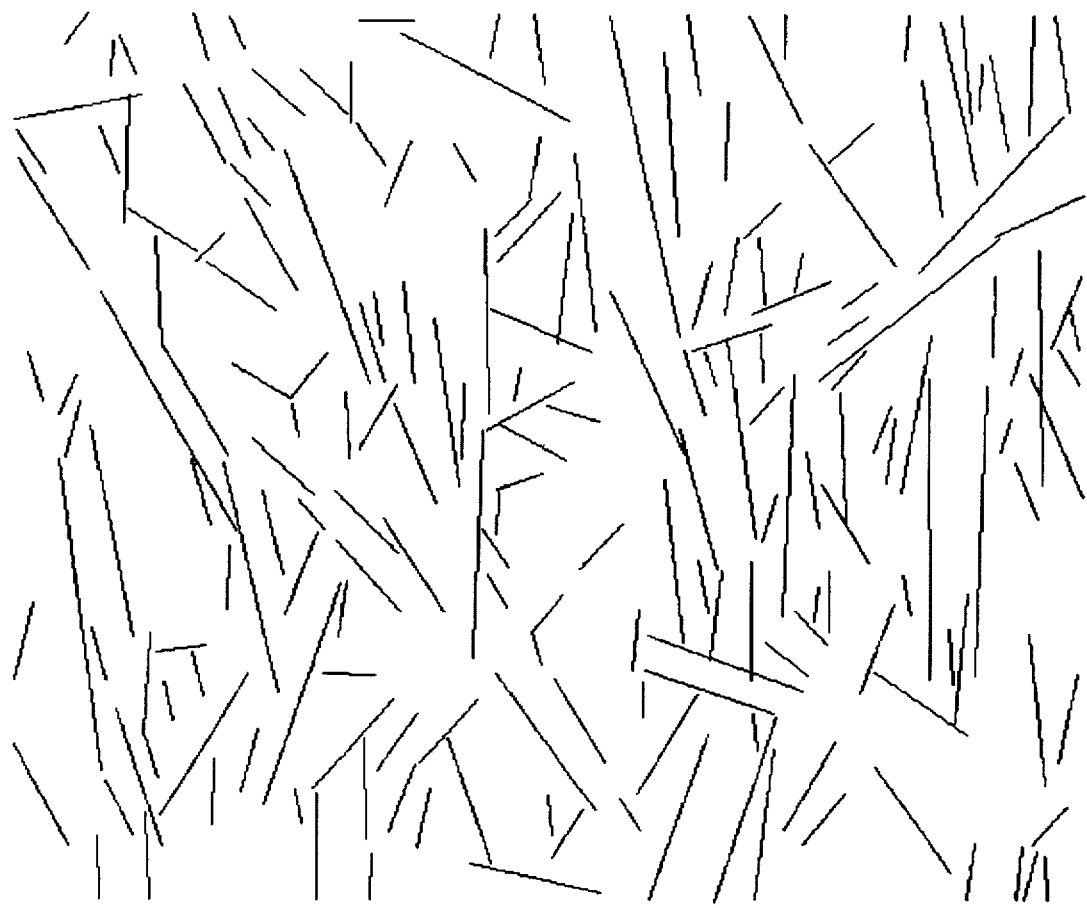
FIG. 14 shows the merged edge lines defined for the photo of FIG. 8.

To test the present invention, the strand angles were determined for three separate images, photographs of which are shown in FIGS. 6, 7 and 8. The refined images (edges defined) for each of the three different photographs are shown in FIGS. 9, 10, and 11 respectively; and FIGS. 12, 13 and 14 show the fully processed images for photographs shown in FIGS. 6, 7 and 8 respectively.

A total of seven subimage sizes was used. The parameters at the various stages were:

| Stage | 1 | 2 | 3 | 4 | 5 | 6 | 7 |
|---|---|---|---|---|---|---|---|
| d(pixels) | 1 | 2 | 3 | 4 | 5 | 6 | 7 |
| L(pixels) | 1 | 2 | 3 | 4 | 5 | 10 | 19 |
| M(pixels) | 1 | 2 | 3 | 4 | 5 | 6 | 7 |

It will be apparent that the processed images correspond very well with the original image and provide an accurate indication of the orientation of the various strands by the average orientation. Information such as orientation may be taken from the processed image.

Having described the invention, modifications will be evident to those skilled in the art without departing from the scope of the invention as defined in the appended claims.

We claim:

1. A system for determining the orientation of strands relative to a selected axis by obtaining a grey scale image containing a plurality of said strands with one side thereof emphasized, selecting edge pixels representative of said side, segmenting said image into a plurality of subimages, processing said subimages to define pixel groups composed of edge pixels meeting a first set of criteria, applying a regression technique to said edge pixels in each said pixel group to define straight pixel lines based on said regression, merging said straight pixel lines to form line segment groups of pixels and applying said regression technique to each of said line segment groups to define straight line segments and culling selected ones of said straight lines in each of said subimages to provide a modified subimage, combining said modified subimage with co-terminus other of said modified subimages that have been similarly processed to form a combined subimage, processing said combined subimage by merging said straight pixel lines and said straight line segments meeting a second set of criteria to form further pixel groups each representing a further line segment, applying said regression technique to said further pixel groups representing said further line segments to form further straight line segments and culling selected ones of said straight lines in said combined subimage and repeating said combining and processing until all said image has been processed to provide a plurality of groups of pixels each representing a strand line, applying said regression technique to said pixels of each said groups of pixels representing a strand line to form straight strand lines and defining the orientation of said straight strand lines relative to said axis.

2. A system as defined in claim 1 wherein said regression technique comprises a least squares regression.

3. A system for determining the orientation of strands as defined in claim 2 wherein said merging comprises a hierarchical merging which includes merging based on a relative position of said pixels in said straight pixel lines and/or said straight line segments.

4. A system for determining the orientation of strands as defined in claim 3 wherein said merging further includes determining collinearity of said straight pixel lines and/or said straight line segments as one of said second set of criteria.

5. A system for determining the orientation of strands as defined in claim 4 wherein said determining collinearity is based on distances between an end point of one of an adjacent pair of straight pixel lines and/or straight line segments being processed and an adjacent end point of the other of said pair of straight pixel lines and/or straight line segments.

6. A system for determining the orientation of strands as defined in claim 5 wherein said collinearity is based on three shortest distances between said adjacent end points of said adjacent pair of straight pixel lines and/or straight line segments.

7. A system for determining the orientation of strands as defined in claim 5 wherein said culling comprises determining the end points of a straight pixel line and/or straight line segment and culling said straight pixel line and/or straight line segment if said end points are within a predetermined spacing from each other.

8. A system for determining the orientation of strands as defined in claim 4 wherein said culling comprises determining the end points of a straight pixel line and/or straight line segment and culling said straight pixel line and/or straight line segment if said end points are within a predetermined spacing from each other.

9. A system for determining the orientation of strands as defined in claim 6 wherein said culling comprises determining the end points of a straight pixel line and/or straight line segment and culling said straight pixel line and/or straight line segment if said end points are within a predetermined spacing from each other.

10. A system for determining the orientation of strands as defined in claim 2 wherein said selecting edge pixel comprises finding gradient image based on pixels surrounding an edge pixel, providing gradient image having high values where the grey scale image shows high contrast changes, thresholding said gradient image to determine pixel edges.

11. A system for determining the orientation of strands as defined in claim 3 wherein said selecting edge pixel comprises finding gradient image based on pixels surrounding an edge pixel, providing gradient image having high values where the grey scale image shows high contrast changes, thresholding said gradient image to determine pixel edges.

12. A system for determining the orientation of strands as defined in claim 4 wherein said selecting edge pixel comprises finding gradient image based on pixels surrounding an edge pixel, providing gradient image having high values where the grey scale image shows high contrast changes, thresholding said gradient image to determine pixel edges.

13. A system for determining the orientation of strands as defined in claim 5 wherein said selecting edge pixel comprises finding gradient image based on pixels surrounding an edge pixel, providing gradient image having high values where the grey scale image shows high contrast changes, thresholding said gradient image to determine pixel edges.

14. A system for determining the orientation of strands as defined in claim 6 wherein said selecting edge pixel comprises finding gradient image based on pixels surrounding an edge pixel, providing gradient image having high values where the grey scale image shows high contrast changes, thresholding said gradient image to determine pixel edges.

15. A system for determining the orientation of strands as defined in claim 7 wherein said selecting edge pixel comprises finding gradient image based on pixels surrounding an edge pixel, providing gradient image having high values where the grey scale image shows high contrast changes, thresholding said gradient image to determine pixel edges.

16. A system for determining the orientation of strands as defined in claim 8 wherein said selecting edge pixel comprises finding gradient image based on pixels surrounding an edge pixel, providing gradient image having high values where the grey scale image shows high contrast changes, thresholding said gradient image to determine pixel edges.

17. A system for determining the orientation of strands as defined in claim 9 wherein said selecting edge pixel comprises finding gradient image based on pixels surrounding an edge pixel, providing gradient image having high values where the grey scale image shows high contrast changes, thresholding said gradient image to determine pixel edges.

* * * * *